(12) United States Patent
Harada et al.

(10) Patent No.: US 6,979,930 B2
(45) Date of Patent: Dec. 27, 2005

(54) STATOR FOR AN AUTOMOTIVE ALTERNATOR

(75) Inventors: Yoshihiro Harada, Tokyo (JP); Kensaku Kuroki, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/118,902

(22) Filed: Apr. 10, 2002

(65) Prior Publication Data

US 2003/0020357 A1 Jan. 30, 2003

(30) Foreign Application Priority Data

Jul. 24, 2001 (JP) .......................... 2001-222373

(51) Int. Cl.[7] .................. H02K 11/02; H02K 15/12
(52) U.S. Cl. ................ 310/216; 310/217; 310/259
(58) Field of Search .................. 310/216, 217, 310/218, 254, 258, 259; 29/596–598, 516, 609, 607

(56) References Cited

U.S. PATENT DOCUMENTS

| | | | | |
|---|---|---|---|---|
| 5,477,096 A | * | 12/1995 | Sakashita et al. | 310/216 |
| 6,208,060 B1 | * | 3/2001 | Kusase et al. | 310/254 |
| 6,246,142 B1 | * | 6/2001 | Asao et al. | 310/217 |
| 6,262,511 B1 | * | 7/2001 | Ohashi et al. | 310/258 |
| 6,335,583 B1 | * | 1/2002 | Kusase et al. | 310/254 |
| 6,337,529 B1 | * | 1/2002 | Higashino et al. | 310/254 |
| 6,346,758 B1 | * | 2/2002 | Nakamura | 310/217 |

FOREIGN PATENT DOCUMENTS

JP  2001-112197  4/2001

* cited by examiner

Primary Examiner—Darren Schuberg
Assistant Examiner—Leda Pham
(74) Attorney, Agent, or Firm—Sughrue Mion, PLLC

(57) ABSTRACT

A stator core is constructed by laminating and integrating first and second core divisions with the press punch directions thereof facing each other, each core division being constructed by winding a single strip of magnetic steel sheet into a helical shape with the press punch direction thereof aligned.

4 Claims, 16 Drawing Sheets

F I G. 1
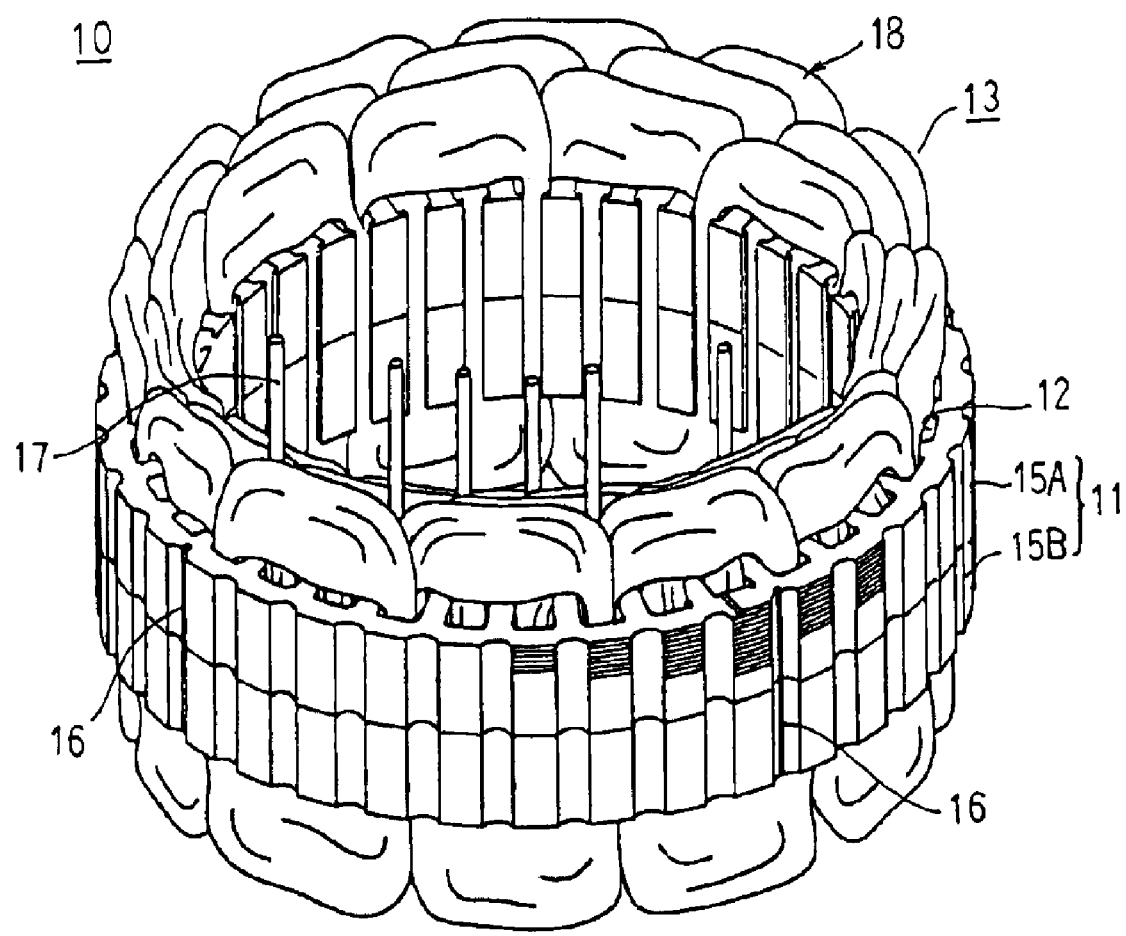

F I G. 4
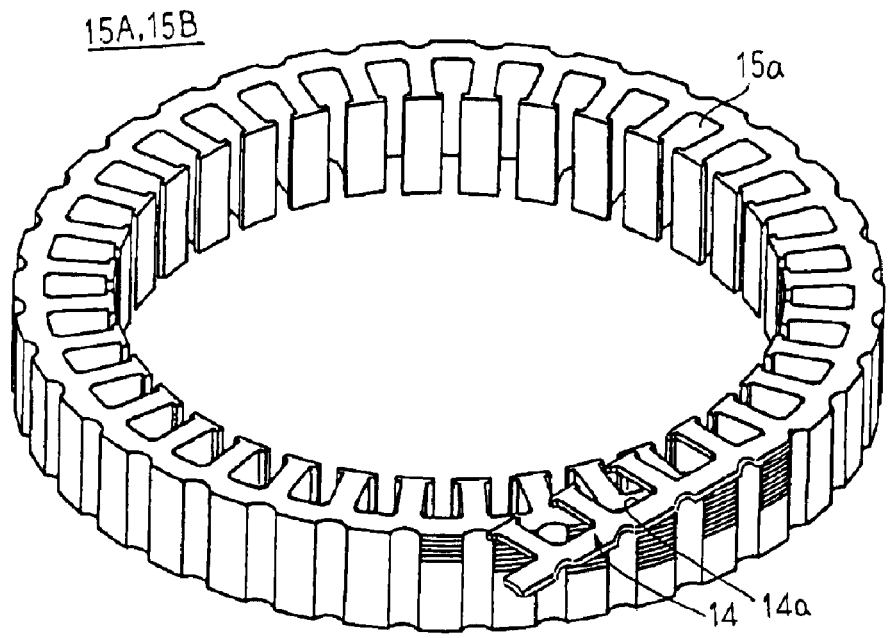
F I G. 5
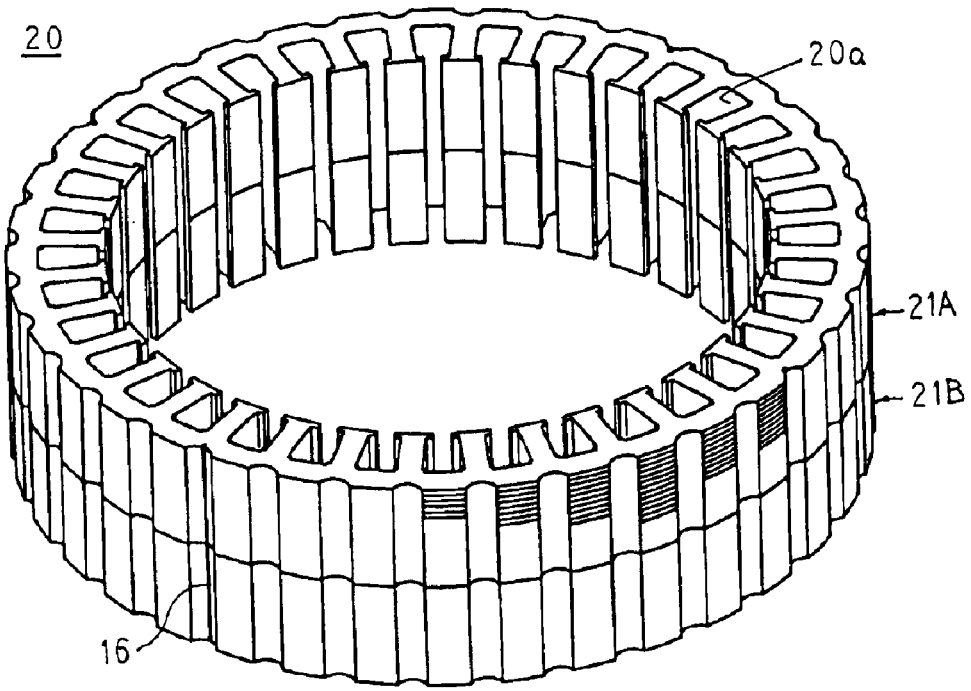

STATOR FOR AN AUTOMOTIVE ALTERNATOR

This application is based on Application No. 2001-222373, filed in Japan on Jul. 24, 2001, the contents of which are hereby incorporated by reference.

BACKGROUND OF THE INVENTION

1. Field of the Invention

The present invention relates to a stator for an automotive alternator and particularly to a construction of a stator core formed by laminating a press-formed magnetic steel sheet.

2. Description of the Related Art

FIG. 20 is a plan explaining a process for forming a laminated body by a first sheet in a conventional stator for an automotive alternator described in Japanese Patent Non-Examined Laid-Open No. 2001-112197, for example, FIG. 21 is a cross section taken along line XXI—XXI in FIG. 20 viewed from the direction of the arrows, FIG. 22 is a plan showing a second sheet in the conventional stator for an automotive alternator, FIG. 23 is a cross section taken along line XXIII—XXIII in FIG. 22 viewed from the direction of the arrows, FIG. 24 is an exploded perspective showing a process for inserting conductor segments into a stator core in the conventional stator for an automotive alternator, and FIG. 25 is a partial cross section explaining a mounted state of a stator winding in the conventional stator for an automotive alternator.

A conventional stator 1 is constituted by: a cylindrical stator core 2 in which slots 3 are formed at a predetermined pitch in a circumferential direction so as to open onto an inner circumferential side; a stator winding 4 installed in the slots 3 of the stator core 2; and insulators 5 mounted inside each of the slots 3.

The stator core 2 is provided with: a laminated body 7 constituted by a first sheet 6; and second sheets 8 disposed at first and second axial ends of the laminated body 7.

As shown in FIG. 20, the laminated body 7 is formed into a cylindrical shape by winding up the first sheet 6 for a predetermined number of winds into a helical shape, the first sheet 6 being formed by using a press die to punch recess portions 6a at a predetermined pitch in a strip-shaped sheet composed of a magnetic material. Here, the recess portions 6a are superposed in an axial direction of the laminated body 7, constituting first slot portions 3a. In the laminated body 7, the first sheet 6 is laminated with the press punch direction aligned, as shown in FIG. 21, and burrs 6b extending in the press punch direction remain on each layer of the first sheet 6 on inner wall surfaces of the first slot portions 3a.

As shown in FIG. 22, the second sheets 8 are each formed into an annular shape by using a press die to punch a flat sheet composed of a magnetic material having a sheet thickness greater than the first sheet 6. Here, second slot portions 3b corresponding in position to the first slot portions 3a are simultaneously press-formed. As shown in FIG. 23, eased portions 8a are formed on a first end side of the second sheets 8 at edge portions of the second slot portions 3b. Moreover, the second sheets 8 are formed so as to be equal in diameter to the laminated body 7.

The second sheets 8 are disposed at first and second end surfaces of the laminated body 7 such that the positions of the first slot portions 3a and the second slot portions 3b align and the eased portions 8a face away from the laminated body 7, and the stator core 2 is prepared by performing several strips of laser welding so as to extend in an axial direction from a first end portion to a second end portion on the outer circumferential surfaces thereof. Moreover, the first and second slot portions 3a and 3b align in an axial direction, constituting the slots 3.

As shown in FIGS. 24 and 25, the stator winding 4 is constructed using a plurality of conductor segments 9 by joining together end portions of the conductor segments 9 by a joining method such as welding, etc. The conductor segments 9 are each prepared by bending into a U shape a short length of copper wire having an electrically-insulating coating. Here, large and small first and second conductor segments 9a and 9b form a basic unit and a plurality of these units are used. The conductor segments 9 are housed in the slots 3 so as to be surrounded by the insulators 5 such that the insulators 5 are installed between the conductor segments 9 and inner wall surfaces of the slots 3. Together with the electrically-insulating coating covering the copper wire of the conductor segments 9, these insulators 5 ensure electrical insulation between the conductor segments 9 and the stator core 2.

The conductor segments 9 and the insulators 5 are inserted into the slots 3 of the stator core 2 in a direction aligned with the press punch direction of the first sheet 6, in other words, from top to bottom in FIG. 25. The stator winding 4 is prepared by bending first end portions of the conductor segments 9 extending outward from the slots 3 of the stator core 2 as indicated by the arrow in FIG. 25 and joining the first end portions to second end portions of conductor segments 9 separated by a predetermined pitch.

In the conventional stator 1 constructed in this manner, the opening edge portions of the slots 3 at the first and second axial end surfaces of the stator core 2 are constituted by the eased portions 8a of the second sheets 8, and the burrs 6b formed by press punching are present only inside the slots 3. Thus, damage to the electrically-insulating coating of the conductor segments 9 caused by the burrs 6b is avoided during insertion of the conductor segments 9, during bending or joining of the end portions of the conductor segments 9, and during shaping of coil ends of the stator winding 4 after joining of the conductor segments 9, thereby improving electrical insulation.

In the conventional stator for an automotive alternator, because the stator core 2 is prepared, as described above, by preparing the laminated body 7 by winding the strip-shaped first sheet 6 in which the recess portions 6a (the first slot portions 3a) are formed by press punching into a helical shape for a predetermined number of winds, disposing the thick annular second sheets 8 in which the second slot portions 3b are formed by press punching at first and second ends of the laminated body 7, and integrating the laminated body 7 and the second sheets 8 by welding, the following problems arise, preventing cost reductions:

First, because the first sheet 6 and the second sheets 8 used have different sheet thicknesses and punched shapes, two types of magnetic material and two types of press die are required, increasing the number of materials, manufacturing processes, and types of equipment; and Second, because the second sheets 8 are disposed on both the first and second ends of the laminated body 7, two second sheets 8 are required, increasing the number of materials and manufacturing processes.

SUMMARY OF THE INVENTION

The present invention aims to solve the above problems and an object of the present invention is to provide a stator for an automotive alternator enabling the number of materials, manufacturing processes, and types of equipment to be suppressed and cost reductions to be achieved while ensuring electrical insulation by constructing a stator core by laminating magnetic steel sheets in which a single type of magnetic material is press formed using a single type of press die and directing the press punch direction of the magnetic steel sheets inward at first and second ends.

Another object of the present invention is to provide a stator for an automotive alternator enabling the number of materials and manufacturing processes to be suppressed and cost reductions to be achieved while ensuring electrical insulation by disposing an end sheet at only a first end of a laminated body formed by laminating a magnetic steel sheet in which a magnetic material is press formed, directing the press punch direction of the magnetic steel sheet inward at a second end of the laminated body, and forming slot outer edge portions of the end sheet into a curved shape.

With the above object in view, a stator for an automotive alternator includes a cylindrical stator core constructed by laminating and integrating magnetic steel sheets in which a plurality of slots are formed by press punching, and a stator winding housed in the slots. The magnetic steel sheets positioned at first and second axial ends of the stator core are disposed such that press punch directions thereof face axially inward relative to the stator core.

Therefore, it is no longer necessary to provide a magnetic steel sheet material having a different sheet thickness and a different type of press die, thereby there is provided an automotive alternator enabling the number of materials, manufacturing processes, and types of equipment to be suppressed and cost reductions to be achieved while ensuring electrical insulation.

The stator core may be constructed by laminating and integrating first and second core divisions with the press punch directions thereof facing each other, the first and second core divisions each being constructed by laminating one or more of the magnetic steel sheets with a press punch direction thereof aligned. The magnetic steel sheets may be formed into a strip shape, the first and second core divisions each being constructed by winding one or more of the magnetic steel sheets into a helical shape. The magnetic steel sheets may be formed into an annular shape, the first and second core divisions each being constructed by laminating a predetermined number of the magnetic steel sheets. The magnetic steel sheets may be formed into a strip shape, the stator core being constructed by stacking at least two strips of the magnetic steel sheets with a press punch direction of the magnetic steel sheets on first and second sides facing inwards and winding the stacked strips into a helical shape. The magnetic steel sheets may be formed into predetermined lengths, the stator core being constructed by constructing a rectangular parallelepiped laminated body by laminating and integrating a predetermined number of the magnetic steel sheets, bending the rectangular parallelepiped laminated body into an annular shape, and abutting and joining together end surfaces of the laminated body, enabling effective use of the magnetic material. The stator winding may be constructed by joining together a plurality of short conductor segments housed in the slots. A winding assembly may be constructed by arranging conductor wire pairs equal in number to a predetermined slot pitch so as to be offset by a pitch of one slot from each other, the conductor wires being formed into a pattern in which straight portions are linked by linking portions and arranged at the predetermined slot pitch and adjacent pairs of the straight portions are offset so as to alternately occupy an inner layer and an outer layer in a slot depth direction by the linking portions, and the conductor wire pairs being formed such that two of the conductor wires are arranged so as to be offset by the predetermined slot pitch from each other with the straight portions superposed, and the stator winding may be constructed by installing one or more of the winding assemblies in the stator core such that the superposed straight portions are housed in each of the slots.

With the above object in view, a stator for an automotive alternator includes a cylindrical stator core in which a plurality of slots are formed, and a stator winding housed in the slots. The stator core is constituted by a cylindrical laminated body formed by laminating a magnetic steel sheet formed by press punching, and an end sheet laminated on a first axial end of the laminated body. The end plate is formed into a flat annular shape by press punching a magnetic material having a sheet thickness greater than that of the magnetic steel sheet. The magnetic steel sheet positioned on a second axial end of the laminated body is disposed such that a press punch direction thereof faces axially inward relative to the laminated body. Slot outer edge portions on a first end surface side of the end sheet are formed into a curved shape. The end sheet is disposed such that a second end surface thereof faces the first axial end surface of the laminated body.

Therefore, it is no longer necessary to provide a end sheet having a different sheet thickness, thereby there is provided an automotive alternator enabling the number of materials and manufacturing processes to be suppressed and cost reductions to be achieved while ensuring electrical insulation.

The magnetic steel sheet may be formed into a strip shape, the laminated body being constructed by winding the magnetic steel sheet into a helical shape with a press punch direction thereof aligned. The magnetic steel sheet may be formed into a strip shape, the laminated body being constructed by stacking at least two strips of the magnetic steel sheets with press punch directions thereof aligned, and winding the stacked strips into a helical shape. The magnetic steel sheet may be formed into an annular shape, the laminated body being constructed by laminating a predetermined number of the magnetic steel sheets with press punch directions thereof aligned.

BRIEF DESCRIPTION OF THE DRAWINGS

FIG. 1 is a perspective showing a stator for an automotive alternator according to Embodiment 1 of the present invention;

FIG. 4 is a perspective explaining a method for manufacturing the stator core used in the stator for an automotive alternator according to Embodiment 1 of the present invention;

FIG. 5 is a perspective showing a stator core used in a stator for an automotive alternator according to Embodiment 2 of the present invention;

DETAILED DESCRIPTION OF THE PREFERRED EMBODIMENTS

The preferred embodiments of the present invention will now be explained with reference to the drawings.

Embodiment 1

Figure 2:
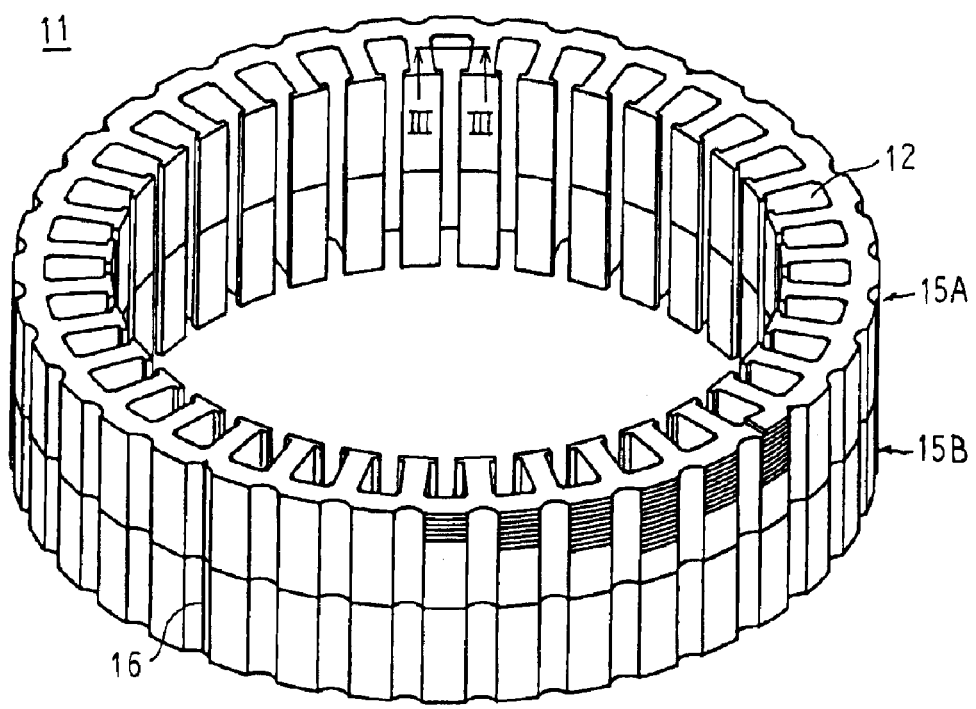
FIG. 2 is a perspective showing a stator core used in the stator for an automotive alternator according to Embodiment 1 of the present invention.
Figure 3:
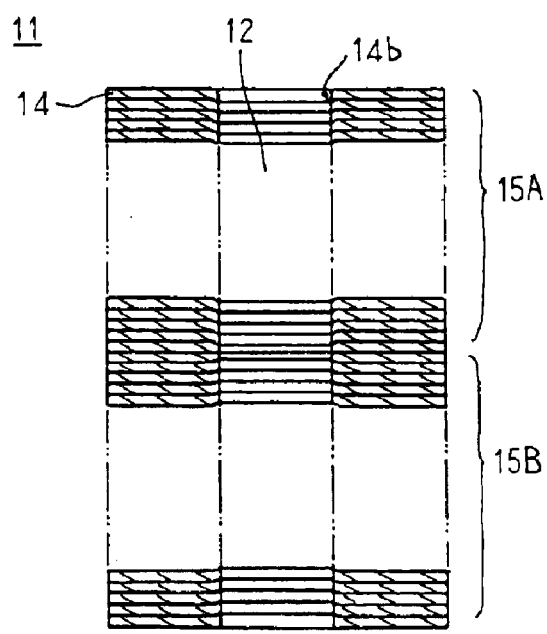
FIG. 3 is a cross section taken along line III–III in FIG. 2 viewed from the direction of the arrows.

FIG. 1 is a perspective showing a stator for an automotive alternator according to Embodiment 1 of the present invention, FIG. 2 is a perspective showing a stator core used in the stator for an automotive alternator according to Embodiment 1 of the present invention, FIG. 3 is a cross section taken along line III—III in FIG. 2 viewed from the direction of the arrows, and FIG. 4 is a perspective explaining a method for manufacturing the stator core used in the stator for an automotive alternator according to Embodiment 1 of the present invention.

In FIG. 1, a stator 10 is constituted by: a cylindrical stator core 11 in which slots 12 are formed at a predetermined pitch in a circumferential direction so as to open onto an inner circumferential side; and a stator winding 13 installed in the slots 12 of the stator core 11.

The stator core 11 is constructed by laminating and integrating a first core division 15A and a second core division 15B.

As shown in FIG. 4, the first and second core divisions 15A and 15B are each formed into a cylindrical shape by winding up a single strip of magnetic steel sheet 14 for a predetermined number of winds into a helical shape, the magnetic steel sheet 14 being formed by using a press die to punch recess portions 14a at a predetermined pitch in a strip-shaped thin sheet composed of a magnetic material having a thickness of 0.3 mm. Here, the recess portions 14a are superposed in an axial direction of the first and second core divisions 15A and 15B, constituting slot portions 15a. Moreover, in each of the first and second core divisions 15A and 15B, the single strip of magnetic steel sheet 14 is laminated with the press punch direction aligned.

The first and second core divisions 15A and 15B are stacked such that the press punch directions thereof face each other and the position of the slot portions 15a align, and the stator core 11 is prepared by performing several strips of laser welding (weld portions 16) so as to extend in an axial direction from a first end portion to a second end portion on the outer circumferential surfaces thereof, as shown in FIG. 2. Moreover, the slot portions 15a align in an axial direction, constituting the slots 12.

As shown in FIG. 3, burrs 14b extending in the press punch direction remain on each layer of the magnetic steel sheet 14 on inner wall surfaces of the slots 12 of the stator core 11. In the layers of the magnetic steel sheet 14 positioned at the first and second axial ends of the stator core 11, the burrs 14b extend axially inward. In other words, the opening edge portions of the slots 12 at first and second end surfaces of the stator core 11 become rounded surfaces (on the opposite side from the burrs), and the burrs 14b do not extend outward from the first and second end surfaces of the stator core 11.

Moreover, a powdered form of an electrically-insulating resin such as an epoxy resin, for example, is electrostatically coated onto the stator core 11, then melted by heating. Hence, the electrically-insulating resin is formed so as to cover the entire surface of the stator core 11.

As shown in FIG. 1, the stator winding 13 is prepared by mounting three winding phase portions 18 into groups of the slots 12 so as to be offset by one slot each, each winding phase portion 18 being formed by installing one conductor wire 17 composed of a copper wire coated with an electrical insulator into a wave winding in every third slot 12. Each of the winding phase portions 18 is formed by preparing an annular unit by winding one conductor wire 17 for a predetermined number of winds, preparing a star-shaped unit by shaping the annular unit into a star shape, and mounting the star-shaped unit into the slots 12 of the stator core 11.

In the stator 10 constructed in this manner, the opening edge portions of the slots 12 at the first and second end surfaces of the stator core 11 are constituted by the rounded surfaces formed by press punching, and the burrs 14b formed by press punching are present only inside the slots 12. Thus, damage to the electrically-insulating coating of the conductor wires 17 caused by the burrs 14b is avoided during mounting of the stator winding 13 and during shaping of coil ends of the stator winding 13, thereby improving electrical insulation.

Because the stator core 11 is prepared by laminating and integrating the first and second core divisions 15A and 15B, which are each constructed by winding into a helical shape a single strip of magnetic steel sheet 14 formed by press forming a strip-shaped magnetic material, it is no longer necessary to provide a magnetic material having a different sheet thickness, enabling the magnetic steel sheet 14 to be press formed by a single type of press die, and also enabling a common wound core mill to be used. Thus, the number of materials, manufacturing processes, and types of equipment are suppressed, enabling cost reductions.

The first and second core divisions 15A and 15B are each prepared by winding a press-formed strip-shaped magnetic steel sheet 14 into a helical shape, more specifically, by winding the magnetic steel sheet 14 into a helical shape with the press punch direction aligned. The stator core 11 is prepared by laminating and integrating the first and second core divisions 15A and 15B with the press punch directions thereof facing each other. Thus, the first and second core divisions 15A and 15B can each be prepared with high dimensional precision without contact between the burrs 14b generated by press punching. Consequently, the only contact portions between the burrs 14b in the stator core 11 are at abutted surfaces of the first and second core divisions 15A and 15B, enabling suppression of dimensional errors.

Moreover, in Embodiment 1 above, the stator core 11 is constituted by two core divisions, but the number of the core divisions is not limited to two, and may be three or more.

In Embodiment 1 above, the first and second core divisions 15A and 15B are each prepared by winding a single strip of the magnetic steel sheet 14 into a helical shape, but the core divisions may be each prepared by stacking a plurality of strips of the magnetic steel sheet 14 on top of each another with the press punch direction aligned and winding up the stacked strips into a helical shape. In that case, the number of winds is reduced significantly, shortening manufacturing time for the first and second core divisions.

In Embodiment 1 above, insulators are not mounted to each of the slots 12, but insulators may obviously be mounted to each of the slots 12.

Embodiment 2

In Embodiment 2, as shown in FIG. 5, a stator core 20 is prepared by laminating first and second core divisions 21A and 21B and performing several strips of laser welding (weld portions 16) on the outer circumferential surfaces thereof so as to extend in an axial direction from a first end portion to a second end portion.

Figure 6:
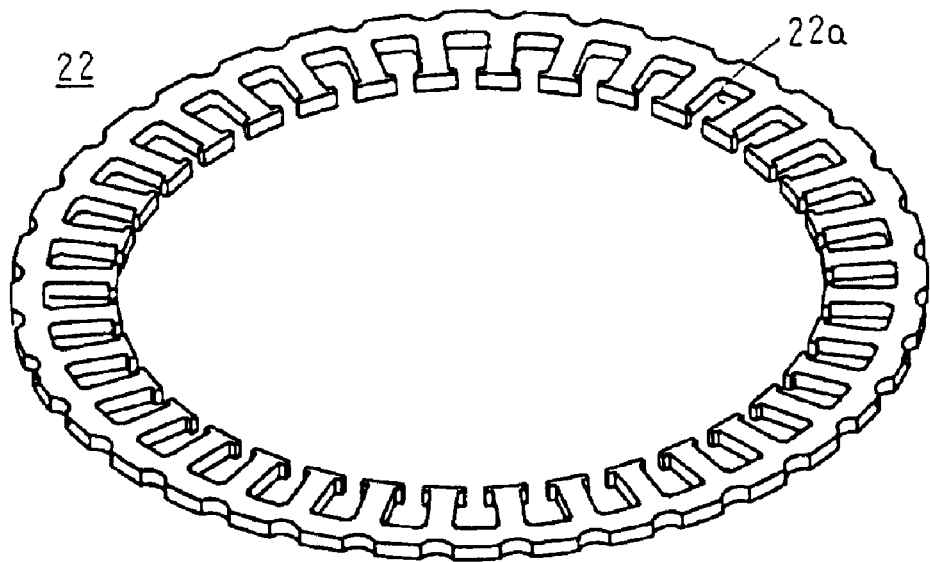
FIG. 6 is a perspective showing a magnetic sheet constituting part of a stator core used in a stator for an automotive alternator according to Embodiment 3 of the present invention.

These first and second core divisions 21A and 21B are each constructed by laminating a predetermined number of magnetic steel sheets 22 with the press punch direction aligned, the magnetic steel sheets each being formed by using a press die to punch a flat thin sheet composed of a magnetic material having a sheet thickness of 0.3 mm into an annular shape. As shown in FIG. 6, recess portions 22a are formed in these magnetic steel sheets 22 at a predetermined pitch in a circumferential direction. The recess portions 22a are superposed in an axial direction in the first and second core divisions 21A and 21B, constituting slots 20a.

The stator core 20 is prepared by laminating and integrating the first and second core divisions 21A and 21B prepared in this manner with the press punch directions thereof facing each other.

Moreover, the rest of this embodiment is constructed in a similar manner to Embodiment 1 above.

Consequently, similar effects to those in Embodiment 1 above can also be achieved in Embodiment 2.

Embodiment 3

Figure 7:
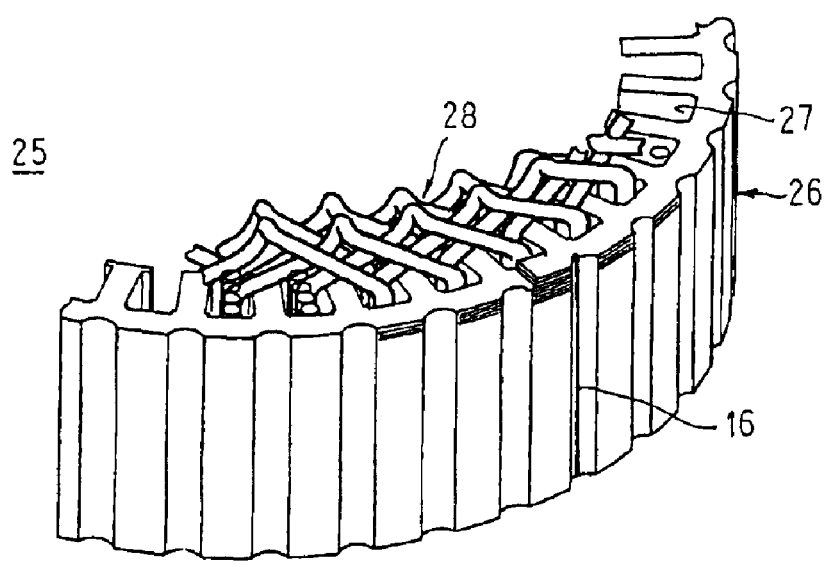
FIG. 7 is a perspective showing part of the stator for an automotive alternator according to Embodiment 3 of the present invention.
Figure 8:
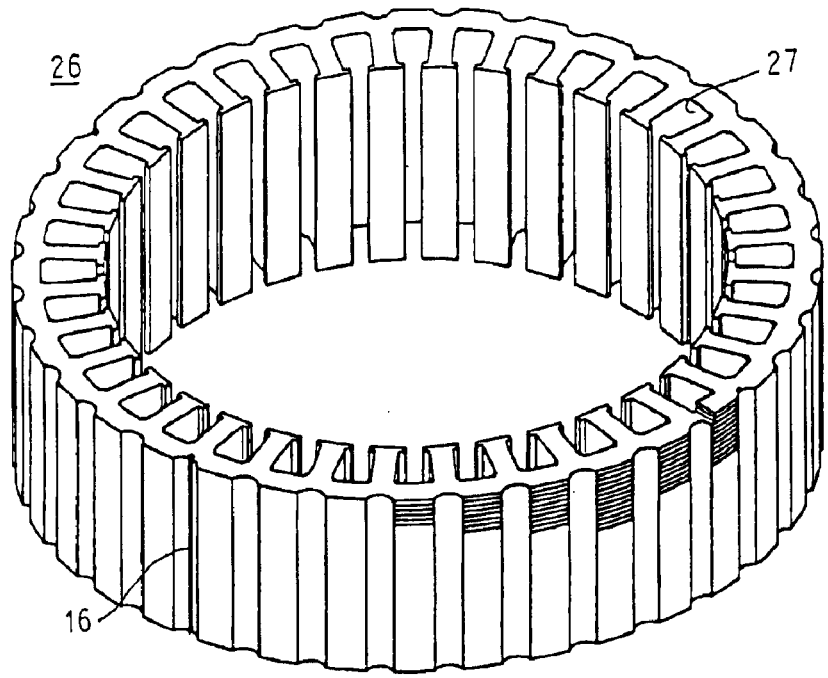
FIG. 8 is a perspective showing the stator core used in the stator for an automotive alternator according to Embodiment 3 of the present invention.
Figure 9:
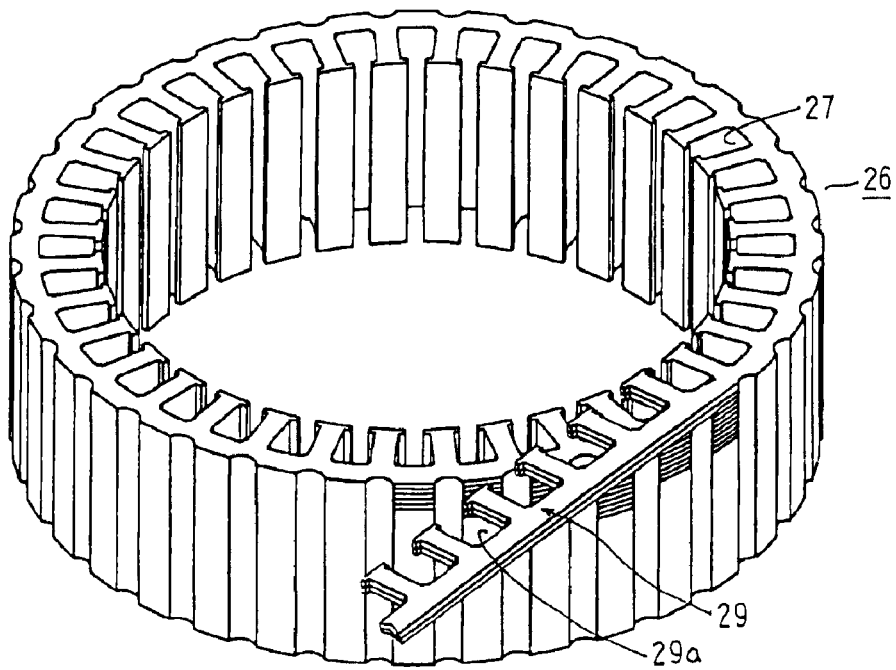
FIG. 9 is a perspective explaining a method for manufacturing the stator core used in the stator for an automotive alternator according to Embodiment 3 of the present invention.
Figure 10A:
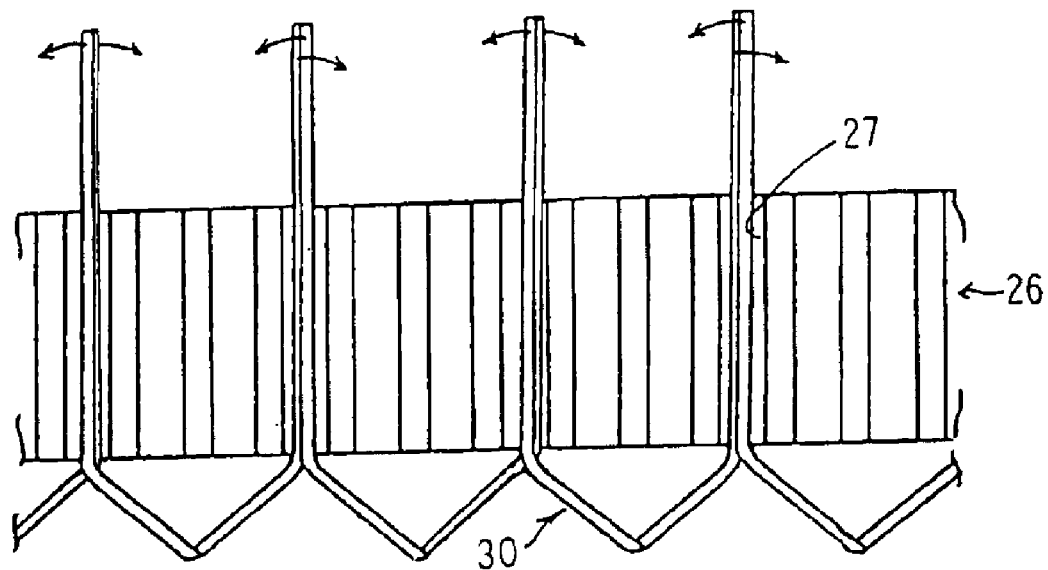
FIG. 10A is a process cross section explaining a method for manufacturing a stator winding used in the stator for an automotive alternator according to Embodiment 3 of the present invention.
Figure 10B:
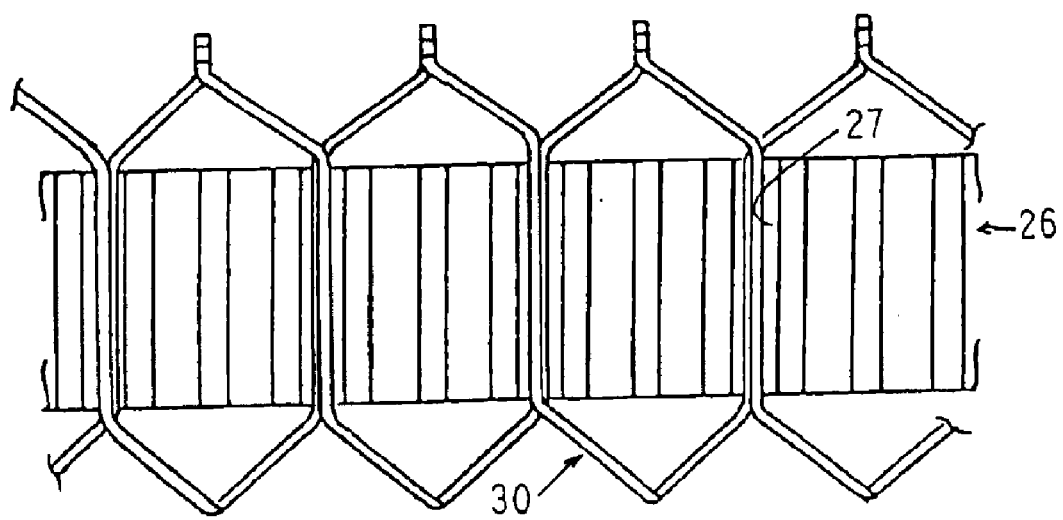
FIG. 10B is another process cross section explaining the method for manufacturing the stator winding used in the stator for an automotive alternator according to Embodiment 3 of the present invention.

FIG. 7 is a perspective showing part of the stator for an automotive alternator according to Embodiment 3 of the present invention, FIG. 8 is a perspective showing the stator core used in the stator for an automotive alternator according to Embodiment 3 of the present invention, FIG. 9 is a perspective explaining a method for manufacturing the stator core used in the stator for an automotive alternator according to Embodiment 3 of the present invention, FIG. 10A is a process cross section explaining a method for manufacturing a stator winding used in the stator for an automotive alternator according to Embodiment 3 of the present invention, and FIG. 10B is another process cross section explaining the method for manufacturing the stator winding used in the stator for an automotive alternator according to Embodiment 3 of the present invention.

In FIG. 7, a stator 25 is constituted by: a cylindrical stator core 26 in which a plurality of slots 27 are formed; and a stator winding 28 installed in the slots 27 of the stator core 26.

As shown in FIG. 8, the slots 27 of the stator core 26 are formed at a predetermined pitch in a circumferential direction so as to open onto an inner circumferential side. As shown in FIG. 9, this stator core 26 is prepared by forming two strips of magnetic steel sheet 29 by using a press die to punch recess portions 29a at a predetermined pitch in strip-shaped thin sheets composed of a magnetic material having a sheet thickness of 0.3 mm, superposing the two strips of magnetic steel sheet 29 with the press punch directions thereof facing each other, winding up the two strips of magnetic steel sheet 29 for a predetermined number of winds into a helical shape, and performing several strips of laser welding (weld portions 16) on the outer circumferential surfaces thereof so as to extend in an axial direction from a first end portion to a second end portion. Here, the recess portions 29a are superposed in an axial direction of the stator core 26, constituting the slots 27.

Moreover, a powdered form of an electrically-insulating resin such as an epoxy resin, for example, is electrostatically coated onto the stator core 26, then melted by heating. Hence, the electrically-insulating resin is formed so as to cover the entire surface of the stator core 26.

The stator winding 28 is constructed using a plurality of conductor segments 30 by joining together end portions of these conductor segments 30 by a joining method such as welding, etc. The conductor segments 30 are each prepared by bending into a U shape a short length of copper wire having an electrically-insulating coating. As shown in FIG. 10A, two of the conductor segments 30 are inserted into pairs of slots 27 of the stator core 26 separated by three slots. End portions of each of the conductor segments 30 extending outward from the slots 27 of the stator core 26 are bent into a splayed shape as indicated by the arrows in FIG. 10A. As shown in FIG. 10B, end portions of conductor segments 30 separated by three slots are joined together to prepare a single winding phase portion wound into a wave winding.

The stator winding 28 is constructed by installing three single winding phase portions prepared in this manner in the slots 27 so as to be offset by one slot each.

In the stator 25 constructed in this manner, the stator core 26 is prepared by winding two strips of magnetic steel sheet 29 superposed with the press punch directions thereof facing each other for a predetermined number of winds into a helical shape. Hence, burrs extending in the press punch direction remain on each layer of the magnetic steel sheets 29 on inner wall surfaces of the slots 27 of the stator core 26. In the layers of the magnetic steel sheets 29 positioned at the first and second axial ends of the stator core 26, the burrs extend axially inward. In other words, opening edge portions of the slots 27 at first and second end surfaces of the stator core 26 become rounded surfaces (on the opposite side from the burrs), and the burrs do not extend outward from the first and second end surfaces of the stator core 26.

Thus, damage to the electrically-insulating coating of the conductor wires 30 caused by burrs is avoided during mounting of the stator winding 28 and during shaping of coil ends of the stator winding 28, thereby improving electrical insulation.

Because the stator core 26 is prepared by winding into a helical shape two strips of magnetic steel sheet 29 formed by press forming a strip-shaped magnetic material, it is no longer necessary to provide a magnetic material having a different sheet thickness, enabling the magnetic steel sheets 29 to be press formed by a single type of press die, and also enabling a common wound core mill to be used. Thus, the number of materials, manufacturing processes, and types of equipment are suppressed, enabling cost reductions. Furthermore, it is not necessary to prepare two core divisions as in Embodiments 1 and 2 above, enabling the stator core to be prepared by a wound core process alone, thereby simplifying the manufacturing process.

Because the stator winding 28 is prepared by joining together short conductor segments 30, alignment in rows and increased density in the coil ends are enabled, providing a stator which can achieve compactness and high output.

Moreover, in Embodiment 3 above, two strips of magnetic steel sheet 29 superposed with the press punch directions thereof facing each other are wound into a helical shape, but the number of strips of the magnetic steel sheet 29 wound into a helical shape is not limited to two strips; three or more strips of the magnetic steel sheet 29 may also be superposed and wound into a helical shape. In that case, the magnetic steel sheets 29 in the outside layers should be superposed with the press punch direction thereof facing inwards.

Embodiment 4

Figure 11:
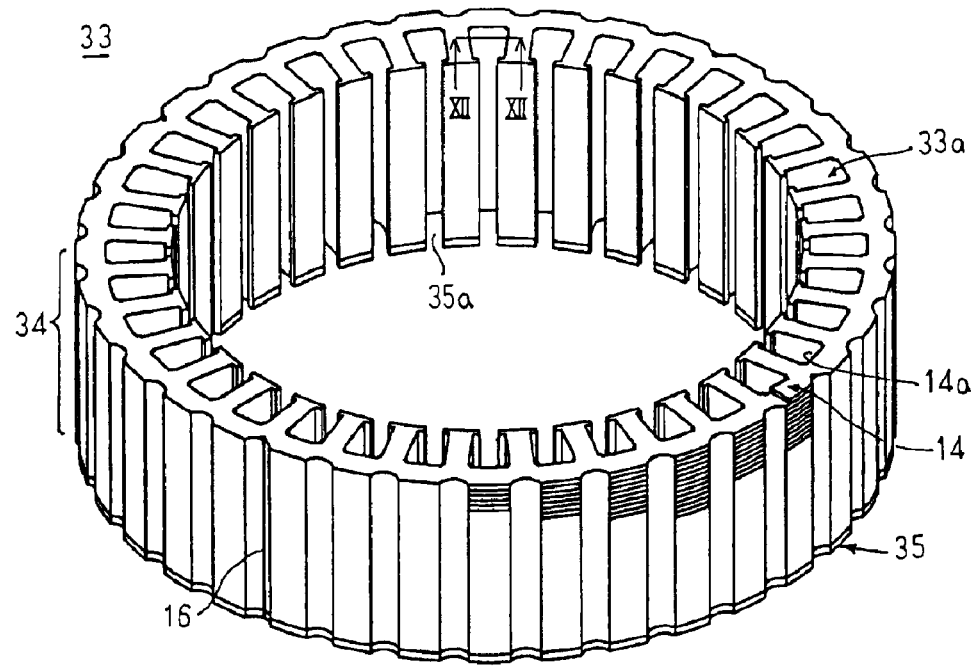
FIG. 11 is a perspective showing a stator core used in a stator for an automotive alternator according to Embodiment 4 of the present invention.
Figure 12:
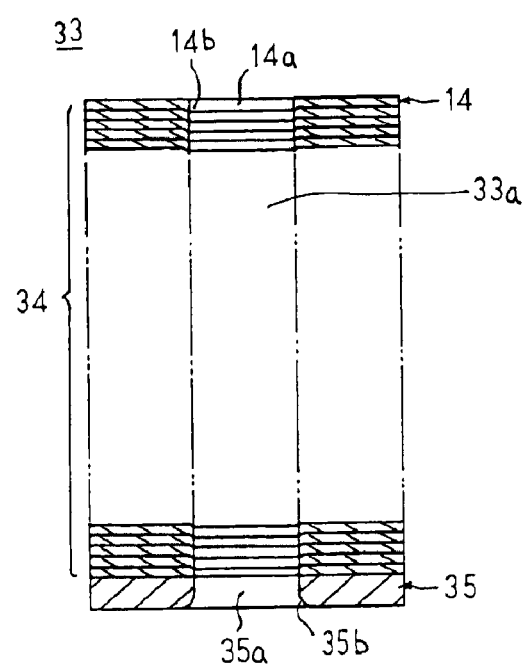
FIG. 12 is a cross section taken along line XII—XII in FIG. 11 viewed from the direction of the arrows.

FIG. 11 is a perspective showing a stator core used in a stator for an automotive alternator according to Embodiment 4 of the present invention, and FIG. 12 is a cross section taken along line XII—XII in FIG. 11 viewed from the direction of the arrows.

In FIG. 11, a stator core 33 is provided with: a laminated body 34 prepared by forming a single strip of magnetic steel sheet 14 by using a press die to punch recess portions 14a at a predetermined pitch in a strip-shaped thin sheet composed of a magnetic material having a sheet thickness of 0.3 mm, winding up the single strip of magnetic steel sheet 14 into a helical shape for a predetermined number of winds with the press punch direction aligned, and performing several strips of laser welding (weld portions 16) on the outer circumferential surfaces thereof so as to extend in an axial direction from a first end portion to a second end portion; and an annular end sheet 35 formed by using a press die to punch recess portions 35a at a predetermined pitch in a magnetic material having a sheet thickness of 1.0 mm. The stator core 33 is prepared by disposing the end sheet 35 at a first end of the laminated body 34 and performing several strips of laser welding (weld portions 16) on the outer circumferential surfaces thereof so as to extend in an axial direction from a first end portion to a second end portion. The recess portions 14a and 35a are superposed in an axial direction, constituting slots 33a of the stator core 33.

Here, the laminated body 34 is constructed in a similar manner to the first and second core divisions 15A and 15B in Embodiment 1 above except for the fact that the number of winds of the magnetic steel sheet 14 is different. The magnetic steel sheet 14 is laminated such that the press punch direction faces towards a first end of the laminated body 34. The end sheet 35 is constructed in a similar manner to the magnetic steel sheets 22 in Embodiment 2 above except for the fact that the thickness of the magnetic material different, and the fact that outer circumferential edge portions 35b of the recess portions 35a on the first end surface side are formed into a curved shape having a radius of 0.5 mm by easing or punching. The end sheet 35 is laminated onto the first end of the laminated body 34 such that the second end surface of the end sheet 35 faces the first end surface of the laminated body 34.

Moreover, the rest of this embodiment is constructed in a similar manner to Embodiment 1 above.

As shown in FIG. 12, burrs 14b extending in the press punch direction remain on each layer of the magnetic steel sheet 14 on inner wall surfaces of the slots 33a of the stator core 33 constructed in this manner. In the layer of the magnetic steel sheet 14 positioned at the second axial end of the stator core 33, the burrs 14b extend axially inward. In other words, the opening edge portions of the slots 33a at the second end surface of the stator core 33 become rounded surfaces (on the opposite side from the burrs), and the burrs 14b do not extend outward from the second end surface of the stator core 33. On the other hand, the opening edge portions of the slots 33a at the first end surface of the stator core 33 are constituted by the outer edge portions 35b of the recess portions 35a of the end sheet 35, which have a curved shape.

Thus, damage to the electrically-insulating coating of the conductor wires 17 caused by the burrs 14b is avoided during mounting of the stator winding 13 and during shaping of coil ends of the stator winding 13, thereby improving electrical insulation.

Because the end sheet 35 is disposed only at the first end of the laminated body 34, a single end sheet 35 is sufficient, enabling the stator according to this embodiment to be prepared inexpensively compared to the conventional stator 1 which requires two end sheets 8.

Because the laminated body 34 is prepared by winding a single strip of the magnetic steel sheet 14 into a helical shape, the laminated body 34 can be prepared easily using a common wound core mill.

In addition, because the strip-shaped magnetic steel sheet 14 is press formed from the magnetic material, wastage of the magnetic material is reduced compared to when annular magnetic steel sheets are press formed, enabling efficient use of the magnetic material.

Embodiment 5

Figure 13:
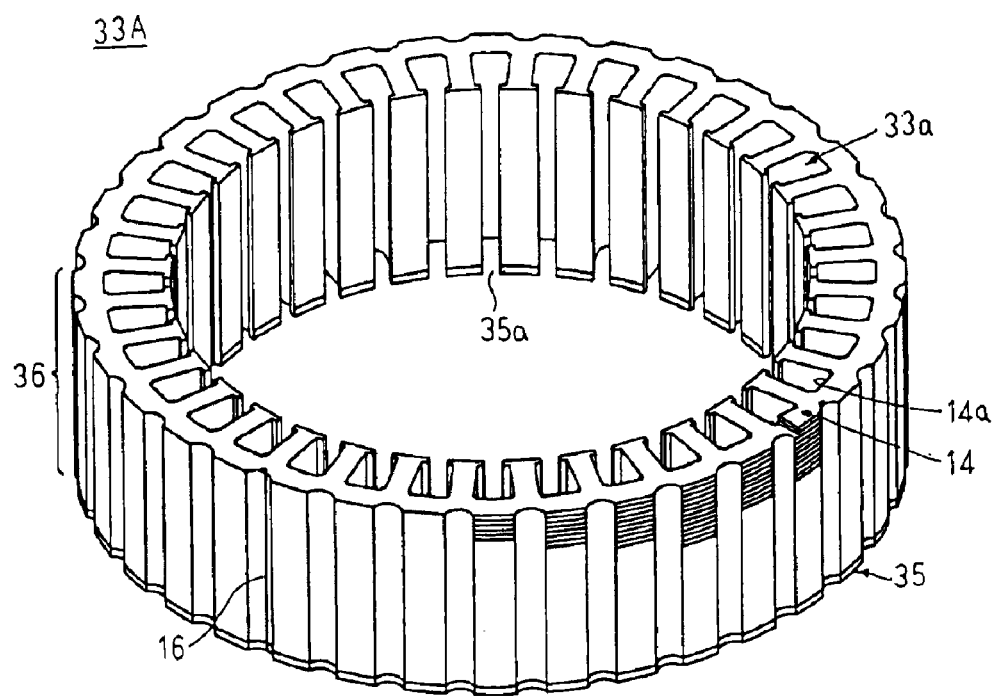
FIG. 13 is a perspective showing a stator core used in a stator for an automotive alternator according to Embodiment 5 of the present invention.

In Embodiment 5, as shown in FIG. 13, a laminated body 36 is prepared by winding two strips of the magnetic steel sheet 14 into a helical shape so as to be superposed on each other with the press punch directions aligned.

Moreover, the rest of this embodiment is constructed in a similar manner to Embodiment 4 above.

In a stator core 33A according to Embodiment 5 constructed in this manner, the opening edge portions of the slots 33a at the second end surface also become rounded surfaces (on the opposite side from the burrs), and the opening edge portions of the slots 33a at the first end surface are also constituted by the outer edge portions 35b of the recess portions 35a of the end sheet 35, which have a curved shape.

Consequently, similar effects to those in Embodiment 4 above are also exhibited in Embodiment 5.

Because the number of winds of the magnetic steel sheet 14 can be reduced, manufacturing time for the laminated body 36 can be shortened.

Embodiment 6

Figure 14:
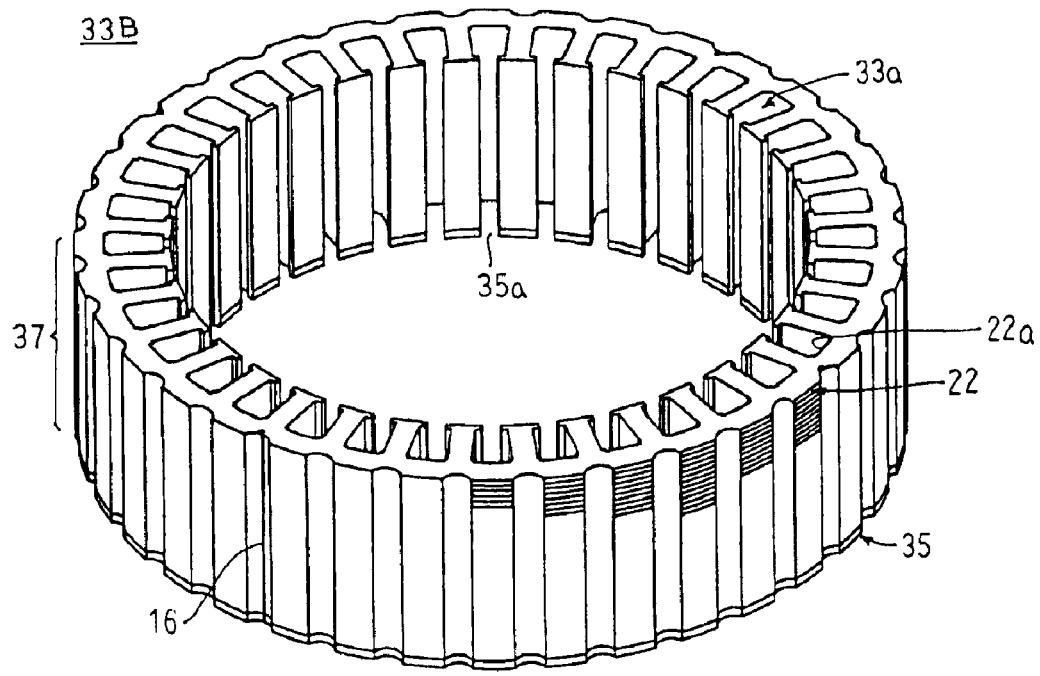
FIG. 14 is a perspective showing a stator core used in a stator for an automotive alternator according to Embodiment 6 of the present invention.

In Embodiment 6, as shown in FIG. 14, a stator core 33B is provided with: a laminated body 37 prepared by forming annular magnetic steel sheets 22 by using a press die to punch recess portions 22a at a predetermined pitch in a strip-shaped thin sheet composed of a magnetic material having a sheet thickness of 0.3 mm, laminating a predetermined number of the magnetic steel sheets 22 with the press punch direction aligned, and performing several strips of laser welding (weld portions 16) on the outer circumferential surfaces thereof so as to extend in an axial direction from a first end portion to a second end portion; and an annular end sheet 35 formed by using a press die to punch recess portions 35a at a predetermined pitch in a magnetic material having a sheet thickness of 1.0 mm. The stator core 33B is prepared by disposing the end sheet 35 at a first end of the laminated body 37, and performing several strips of laser welding (weld portions 16) on the outer circumferential surfaces thereof so as to extend in an axial direction from a first end portion to a second end portion. The recess portions 22a and 35a are superposed in an axial direction, constituting slots 33a of the stator core 33B.

Here, the laminated body 37 is constructed in a similar manner to the first and second core divisions 21A and 21B in Embodiment 2 above except for the fact that the number of laminated magnetic steel sheets 22 is different. The magnetic steel sheets 22 are laminated such that the press punch direction faces towards a first end of the laminated body 37. The end sheet 35 is constructed in a similar manner to the magnetic steel sheets 22 in Embodiment 2 above except for the fact that the thickness of the magnetic material different, and the fact that outer edge portions 35b of the recess portions 35a on the first end surface side are formed into a curved shape having a radius of 0.5 mm by easing or punching. The end sheet 35 is laminated onto the first end of the laminated body 37 such that the second end surface of the end sheet 35 faces the first end surface of the laminated body 37.

Moreover, the rest of this embodiment is constructed in a similar manner to Embodiment 2 above.

In a stator core 33B according to Embodiment 6 constructed in this manner, the opening edge portions of the slots 33a at the second end surface also become rounded surfaces (on the opposite side from the burrs), and the opening edge portions of the slots 33a at the first end surface are also constituted by the outer edge portions 35b of the recess portions 35a of the end sheet 35, which have a curved shape.

Consequently, similar effects to those in Embodiment 4 above are also exhibited in Embodiment 6.

In addition, because the stator core 33B is constituted by the annular magnetic steel sheets 22 and the annular end plate 35, a single type of press die is sufficient, enabling costs to be reduced proportionately.

Embodiment 7

Figure 15:
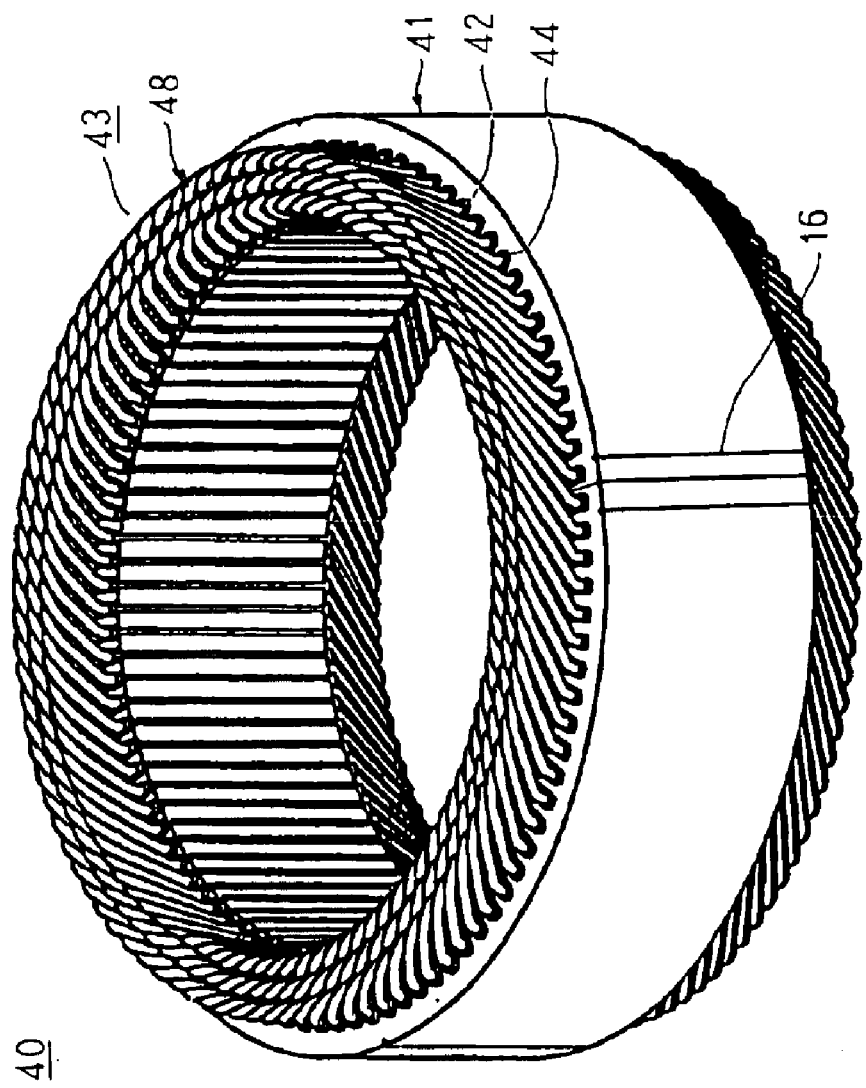
FIG. 15 is a perspective showing a stator for an automotive alternator according to Embodiment 7 of the present invention.
Figure 16:
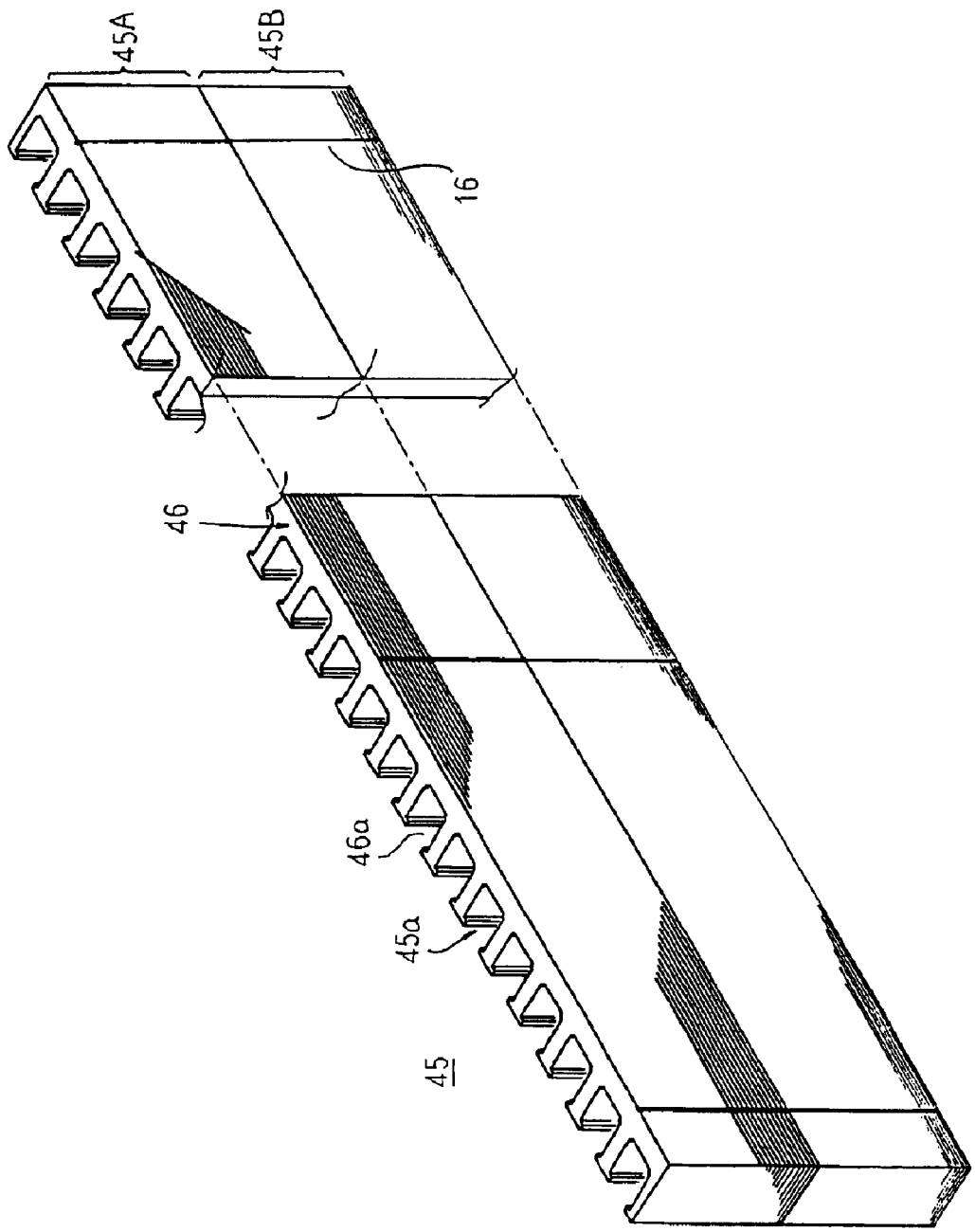
FIG. 16 is a perspective showing a rectangular parallelepiped laminated body constituting a stator core used in the stator for an automotive alternator according to Embodiment 7 of the present invention.
Figure 17:
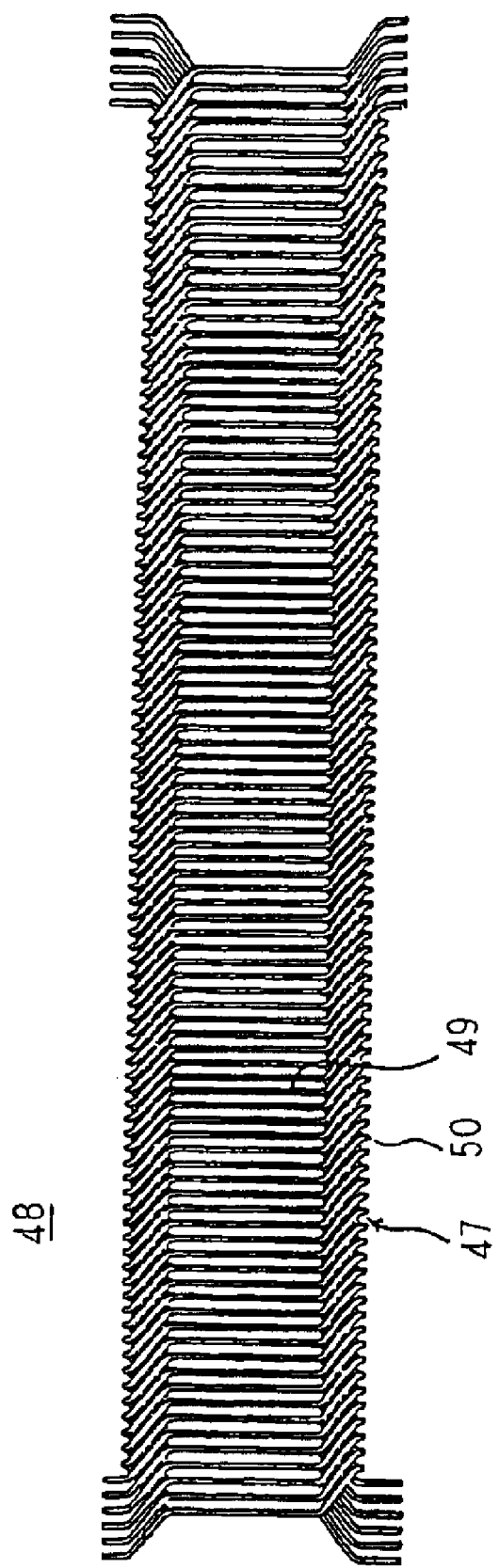
FIG. 17 is a plan showing a winding assembly constituting a stator winding used in the stator for the automotive alternator according to Embodiment 7 of the present invention.
Figure 18:
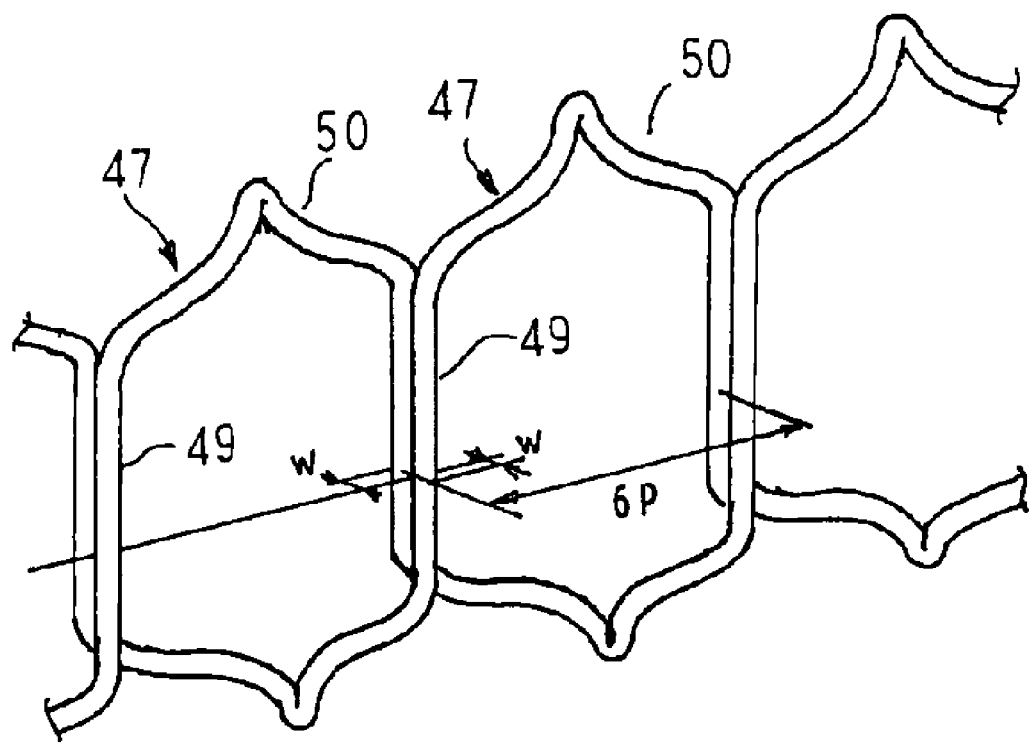
FIG. 18 is a perspective explaining a construction of the winding assembly shown in FIG. 17.
Figure 19A:
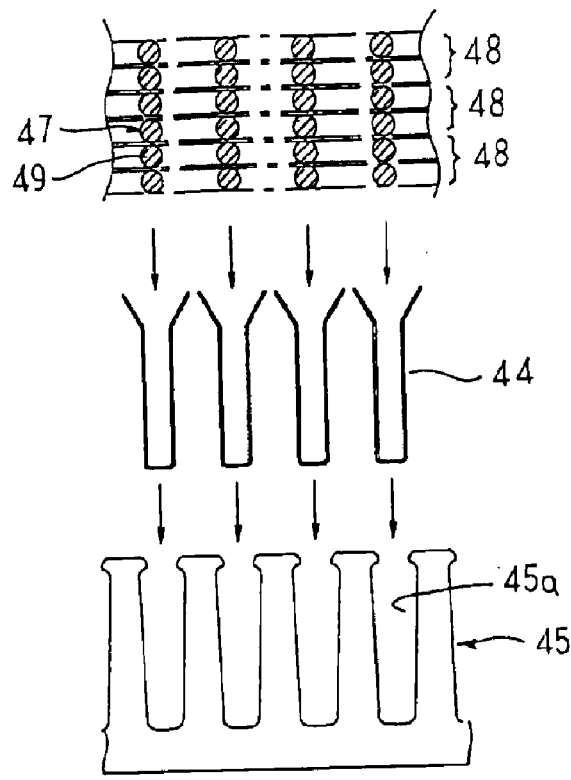
FIG. 19A is a process cross section explaining a method for manufacturing the stator for an automotive alternator according to Embodiment 7 of the present invention.
Figure 19B:
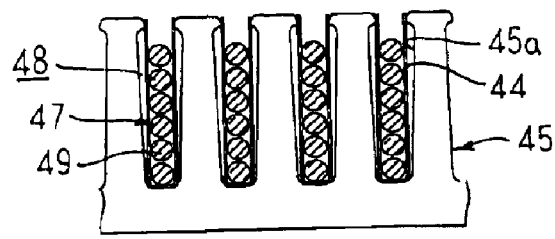
FIG. 19B is another process cross section explaining the method for manufacturing the stator for an automotive alternator according to Embodiment 7 of the present invention.
Figure 19C:
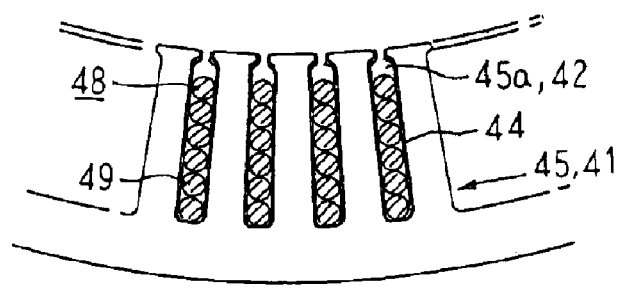
FIG. 19C is still another process cross section explaining the method for manufacturing the stator for an automotive alternator according to Embodiment 7 of the present invention.
Figure 20:
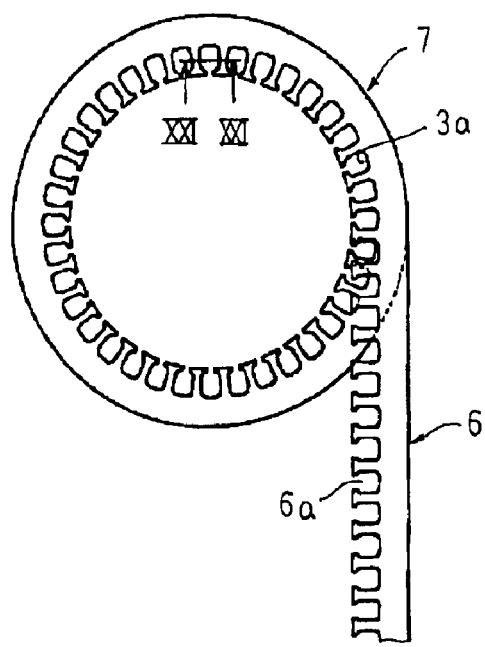
FIG. 20 is a plan explaining a process for forming a laminated body by a first sheet in a conventional stator for an automotive alternator.
Figure 21:
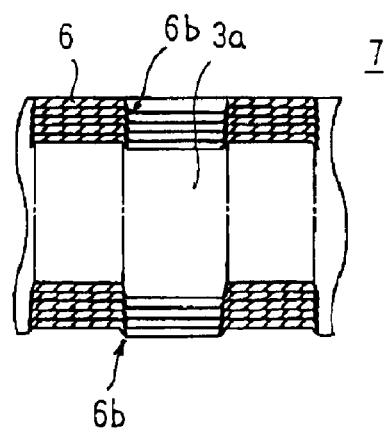
FIG. 21 is a cross section taken along line XXI—XXI in FIG. 20 viewed from the direction of the arrows.
Figure 22:
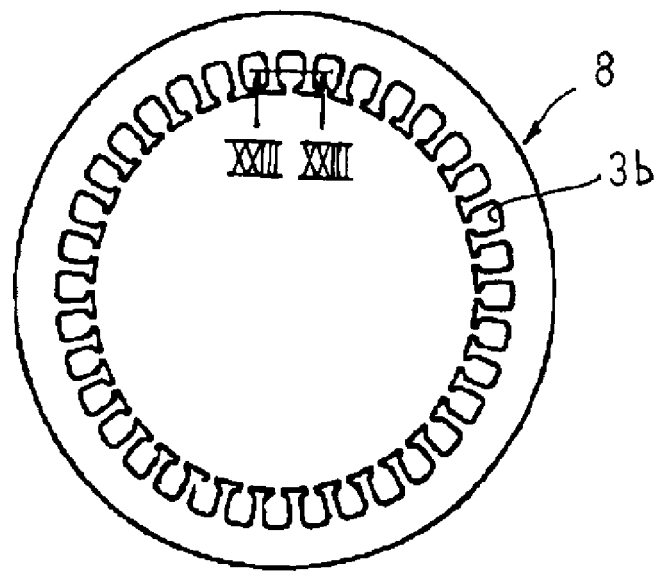
FIG. 22 is a plan showing a second sheet in the conventional stator for an automotive alternator.
Figure 23:
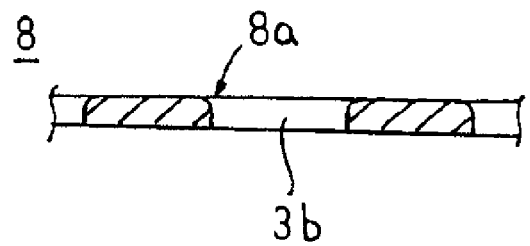
FIG. 23 is a cross section taken along line XXIII—XXIII in FIG. 22 viewed from the direction of the arrows.
Figure 24:
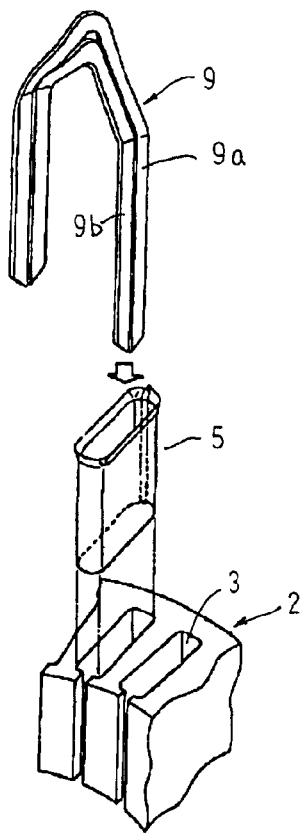
FIG. 24 is an exploded perspective showing a process for inserting conductor segments into a stator core in the conventional stator for an automotive alternator.
Figure 25:
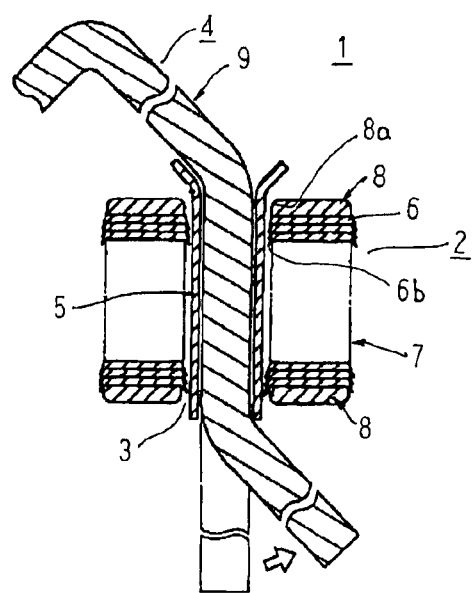
FIG. 25 is a partial cross section explaining a mounted state of a stator winding in the conventional stator for an automotive alternator.

FIG. 15 is a perspective showing a stator for an automotive alternator according to Embodiment 7 of the present invention, FIG. 16 is a perspective showing a laminated body constituting a stator core used in the stator for an automotive alternator according to Embodiment 7 of the present invention, FIG. 17 is a plan showing a winding assembly constituting a stator winding used in the stator for the automotive alternator according to Embodiment 7 of the present invention, FIG. 18 is a perspective explaining a construction of the winding assembly shown in FIG. 17, FIG. 19A is a process cross section explaining a method for manufacturing the stator for an automotive alternator according to Embodiment 7 of the present invention, FIG. 19B is another process cross section explaining the method for manufacturing the stator for an automotive alternator according to Embodiment 7 of the present invention, and FIG. 19C is still another process cross section explaining the method for manufacturing the stator for an automotive alternator according to Embodiment 7 of the present invention.

In FIG. 15, a stator 40 is constituted by: a cylindrical stator core 41 in which slots 42 are formed at a predetermined pitch in a circumferential direction so as to open onto an inner circumferential side; a stator winding 43 installed in the slots 42 of the stator core 41; and insulators 44 mounted in each of the slots 42.

The stator core 41 is prepared by bending a rectangular parallelepiped laminated body 45 into an annular shape, abutting first and second end surfaces of the rectangular parallelepiped laminated body 45, and joining together the abutted portions by a joining means such as laser welding, etc. As shown in FIG. 16, this rectangular parallelepiped laminated body 45 is constituted by first and second laminated body divisions 45A and 45B each prepared by forming magnetic steel sheets 46 of predetermined length by using a press die to punch recess portions 46a at a predetermined pitch in thin sheets of predetermined length composed of a magnetic material having a sheet thickness of 0.5 mm, laminating a predetermined number of the magnetic steel sheets 46 with the press punch directions thereof aligned, and performing several strips of laser welding (weld portions 16) on the outer surfaces thereof so as to extend in the direction of lamination from a first side to a second side. The rectangular parallelepiped laminated body 45 is prepared by stacking the first and second laminated body divisions 45A and 45B with the press punch directions thereof facing each other, and performing several strips of laser welding on an outer surface thereof so as to extend from a first side to a second side in the direction of lamination. Moreover, the recess portions 46a are superposed in the direction of lamination of the magnetic steel sheets 46, constituting slots 45a of the rectangular parallelepiped laminated body 45. In addition, a powdered form of an electrically-insulating resin such as an epoxy resin, for example, is electrostatically coated onto the rectangular parallelepiped laminated body 45, then melted by heating. Hence, the electrically-insulating resin is formed so as to cover the entire surface of the rectangular parallelepiped laminated body 45.

The stator winding 43 is constructed by preparing winding assemblies 48 by simultaneously folding twelve conductor wires 47 composed of a copper wire coated with an electrical insulator, and mounting the winding assemblies 48 into the slots 42 of the stator core 41 so as to be stacked in three layers in a radial direction. Here, the stator core 41 is used in an automotive alternator having a rotor having sixteen poles, for example, and is formed with ninety-six slots 42. In other words, the slots 42 are formed at a ratio of two per phase per pole.

These winding assemblies 48 are each constructed such that ninety-six pairs of slot-housed portions 49 functioning as pairs of straight portions superposed in a direction perpendicular to the surface of the page in FIG. 17 (corresponding to the thickness direction of the winding assemblies 48) are arranged at a pitch of one slot and each slot-housed portion 49 on a first side in the thickness direction of each pair of the slot-housed portion 49 is linked by a linking portion 50 to a slot-housed portion 49 on a second side in the thickness direction in a pair of slot-housed portions 49 six slots away. In other words, as shown in FIG. 18, conductor wires 47 are formed into a pattern in which the slot-housed portions 49 are disposed at a pitch of six slots and linked by the linking portions 50, and adjacent pairs of the slot-housed portions 49 are alternately offset by a width (w) of the conductor wires 47 on a first and second side in the width direction by the linking portions 50, the pairs of conductor wires 47 being formed by disposing two conductor wires 40 so as to be offset by a pitch of six slots from each other with slot-housed portions 49 superposed. Six pairs of the conductor wires 47 constructed in this manner are arranged so as to be offset by a pitch of one slot from each other to constitute each of the winding assemblies 48.

Moreover, the number of pairs of slot-housed portions 49 is equal to the total number of slots 42 in the stator core 41, the number of pairs of conductor wires 47 is equal to the aligned slot pitch of the conductor wires 47, and the aligned slot pitch of the conductor wires 47 is equal to a number of slots three times the ratio of slots per phase per pole.

Next, a method for manufacturing the stator 40 will be explained with reference to FIGS. 19A to 19C.

First, as shown in FIG. 19A, the insulators 44 are inserted into each of the slots 45a of the rectangular parallelepiped laminated body 45, then three winding assemblies 48 are stacked in three layers with the slot-housed portions 49 superposed, and the three winding assemblies 48 are mounted into the rectangular parallelepiped laminated body 45 such that the slot-housed portions 49 are housed inside each of the slots 45a. Hence, as shown in FIG. 19B, the winding assemblies 48 are mounted into the rectangular parallelepiped laminated body 45 so as to be arranged in three layers in a slot depth direction. Then, as shown in FIG. 19C, the rectangular parallelepiped laminated body 45 is bent into an annular shape. The end surfaces of the laminated body 45 are abutted, and the abutted portion is joined integrally by a joining means such as laser welding to obtain the cylindrical stator core 41. Hence, the stator 40 is prepared by installing the stator winding 43 composed of the three winding assemblies 48 in the stator core 41.

In the stator 40 constructed in this manner, the opening edge portions of the slots 42 at the first and second end surfaces of the stator core 41 are constituted by the rounded surfaces formed by press punching, and burrs formed on the magnetic steel sheets 46 by press punching are present only inside the slots 42. Thus, damage to the electrically-insulating coating of the conductor wires 47 caused by the burrs is avoided during mounting of the stator winding 43 and during shaping of coil ends of the stator winding 43, thereby improving electrical insulation.

Because the stator core 41 is constituted by the first and second laminated body divisions 45A and 45B in which the magnetic steel sheets 46 of predetermined length are formed by using a press die to punch the recess portions 46a in thin sheets of predetermined length composed of a magnetic material at a predetermined pitch, and laminating a predetermined number of sheets with the press punch directions thereof aligned, it is not necessary to provide magnetic materials having different sheet thicknesses, thereby enabling the magnetic steel sheets 46 to be press formed by a single type of press die. Thus, the number of materials, manufacturing processes, and types of equipment are suppressed, enabling cost reductions.

The first and second laminated body divisions 45A and 45B are prepared by laminating press-formed magnetic steel sheets 46 of predetermined length with the press punch directions thereof aligned. The rectangular parallelepiped laminated body 45 is prepared by laminating and integrating the first and second laminated body divisions 45A and 45B with the press punch directions thereof facing each other. In addition, the stator core 41 is prepared by bending the rectangular parallelepiped laminated body 45 into an annular shape, abutting end surfaces of the rectangular parallelepiped laminated body 45, and integrally joining the abutted portion. Thus, contact among the burrs generated on the magnetic steel sheets 46 of the first and second laminated body divisions 45A and 45B by press punching is eliminated, enabling preparation with high dimensional precision. Consequently, in the stator core 41, contact portions among the burrs occur only at the abutted surfaces of the first and second laminated body divisions 45A and 45B, enabling suppression of dimensional errors.

Because the stator winding 43 is prepared by installing the winding assemblies 48 in the stator core 41, alignment in rows and increased density in the coil ends are enabled, providing a stator which can achieve compactness and high output. In addition, the number of joints in the coil ends can be reduced significantly compared to Embodiment 3 above, improving assembly of the stator winding.

Moreover, in Embodiment 7 above, the laminated body 45 is prepared by forming the first and second laminated body divisions 45A and 45B by laminating the magnetic steel sheets 46 with the press punch directions thereof aligned, and stacking and integrally joining the first and second laminated body divisions 45A and 45B with the press punch directions thereof facing each other, but the laminated body is not limited to this construction; it is only necessary for the press punch direction of the magnetic steel sheets 46 positioned at first and second ends of the laminated body in the direction of lamination to be disposed facing inward relative to the direction of lamination on the laminated body, and the laminated body may be prepared by laminating a predetermined number of pairs of magnetic steel sheets 46 each superposed with the press punch directions thereof facing each other, for example.

The present invention is constructed in the above manner and exhibits the effects described below.

In order to achieve the above object, according to one aspect of the present invention, there is provided a stator for an automotive alternator including:

a cylindrical stator core constructed by laminating and integrating magnetic steel sheets in which a plurality of slots are formed by press punching; and a stator winding housed in the slots, wherein the magnetic steel sheets positioned at first and second axial ends of the stator core are disposed such that press punch directions thereof face axially inward relative to the stator core, making a single type of magnetic steel sheet material and a single type of press die sufficient, thereby providing an automotive alternator enabling the number of materials, manufacturing processes, and types of equipment to be suppressed and cost reductions to be achieved while ensuring electrical insulation.

The stator core may be constructed by laminating and integrating first and second core divisions with the press punch directions thereof facing each other, the first and second core divisions each being constructed by laminating one or more of the magnetic steel sheets with a press punch direction thereof aligned, enabling dimensional errors resulting from burrs formed on the magnetic steel sheet by press punching to be minimized.

The magnetic steel sheets may be formed into a strip shape, the first and second core divisions each being constructed by winding one or more of the magnetic steel sheets into a helical shape, enabling a common wound core mill to be used, thereby suppressing the number of types of equipment.

The magnetic steel sheets may be formed into an annular shape, the first and second core divisions each being constructed by laminating a predetermined number of the magnetic steel sheets, enabling the stator core to be prepared easily.

The magnetic steel sheets may be formed into a strip shape, the stator core being constructed by stacking at least two strips of the magnetic steel sheets with a press punch direction of the magnetic steel sheets on first and second sides facing inwards and winding the stacked strips into a helical shape, enabling the stator core to be prepared by a wound core process alone without the need to prepare core divisions, further simplifying the manufacturing process.

The magnetic steel sheets may be formed into predetermined lengths, the stator core being constructed by constructing a rectangular parallelepiped laminated body by laminating and integrating a predetermined number of the magnetic steel sheets, bending the rectangular parallelepiped laminated body into an annular shape, and abutting and joining together end surfaces of the laminated body, enabling effective use of the magnetic material.

The stator winding may be constructed by joining together a plurality of short conductor segments housed in the slots, enabling alignment in rows and increased density in the coil ends, thereby achieving increased output.

A winding assembly may be constructed by arranging conductor wire pairs equal in number to a predetermined slot pitch so as to be offset by a pitch of one slot from each other, the conductor wires being formed into a pattern in which straight portions are linked by linking portions and arranged at the predetermined slot pitch and adjacent pairs of the straight portions are offset so as to alternately occupy an inner layer and an outer layer in a slot depth direction by the linking portions, and the conductor wire pairs being formed such that two of the conductor wires are arranged so as to be offset by the predetermined slot pitch from each other with the straight portions superposed, and the stator winding may be constructed by installing one or more of the winding assemblies in the stator core such that the superposed straight portions are housed in each of the slots, enabling alignment in rows and increased density in the coil ends, thereby achieving increased output, and reducing the number of joints in the coil ends, thereby improving the assembly operation.

According to another aspect of the present invention, there is provided a stator for an automotive alternator including:

a cylindrical stator core in which a plurality of slots are formed; and a stator winding housed in the slots, the stator core being constituted by:

a cylindrical laminated body formed by laminating a magnetic steel sheet formed by press punching; and an end sheet laminated on a first axial end of the laminated body, the end plate being formed into a flat annular shape by press punching a magnetic material having a sheet thickness greater than that of the magnetic steel sheet, wherein the magnetic steel sheet positioned on a second axial end of the laminated body is disposed such that a press punch direction thereof faces axially inward relative to the laminated body, and slot outer edge portions on a first end surface side of the end sheet are formed into a curved shape, the end sheet being disposed such that a second end surface thereof faces the first axial end surface of the laminated body, making a single end sheet sufficient, thereby providing an automotive alternator enabling the number of materials and manufacturing processes to be suppressed and cost reductions to be achieved while ensuring electrical insulation.

The magnetic steel sheet may be formed into a strip shape, the laminated body being constructed by winding the magnetic steel sheet into a helical shape with a press punch direction thereof aligned, enabling the laminated body to be prepared easily using a common wound core mill.

The magnetic steel sheet may be formed into a strip shape, the laminated body being constructed by stacking at least two strips of the magnetic steel sheets with press punch directions thereof aligned, and winding the stacked strips into a helical shape, reducing the number of winds of the magnetic steel sheet, thereby shortening manufacturing time for the laminated body.

The magnetic steel sheet may be formed into an annular shape, the laminated body being constructed by laminating a predetermined number of the magnetic steel sheets with press punch directions thereof aligned, making a single type of press die sufficient, thereby enabling cost reductions.

What is claimed is:

1. A stator for an automotive alternator, comprising:

a cylindrical stator core constructed by laminating and integrating magnetic steel sheets in which a plurality of slots are formed by press punching; and a stator winding housed in said slots, wherein said stator core comprises a plurality of core divisions each constructed by laminating a plurality of said magnetic steel sheets with a press punch direction thereof aligned, said stator core being constructed by laminating and integrating said first and second core divisions with said press punch directions of said magnetic steel sheets of all core divisions of said stator core facing axially inward toward a center of said stator core.

2. The stator for an automotive alternator according to claim 1 wherein said magnetic steel sheets are formed into a strip shape, said core divisions each being constructed by winding one or more of said magnetic steel sheets into a helical shape.

3. The stator for an automotive alternator according to claim 1 wherein said magnetic steel sheets are formed into an annular shape, said core divisions each being constructed by laminating a predetermined number of said magnetic steel sheets.

4. A stator for an automotive alternator, comprising:

a cylindrical stator care constructed by laminating and integrating magnetic steel sheets in which a plurality of slots are formed by press punching; and a stator winding housed in said slots, wherein said magnetic steel sheets are formed into a strip shape, and said stator core is constructed by stacking at least two strips of said magnetic steel sheets with a press punch direction of said magnetic steel sheets facing axially inwards relative to said stator core and winding said stacked strips into a helical shape, said magnetic steel sheets positioned at first and second axial ends of said stator core being disposed such that press punch directions thereof face axially inward relative to said stator core.

* * * * *